Oct. 21, 1930.   H. R. ROWLAND   1,779,402
ART OF MANUFACTURING USEFUL PRODUCTS FROM HYDROCARBONS
Filed Nov. 21, 1923
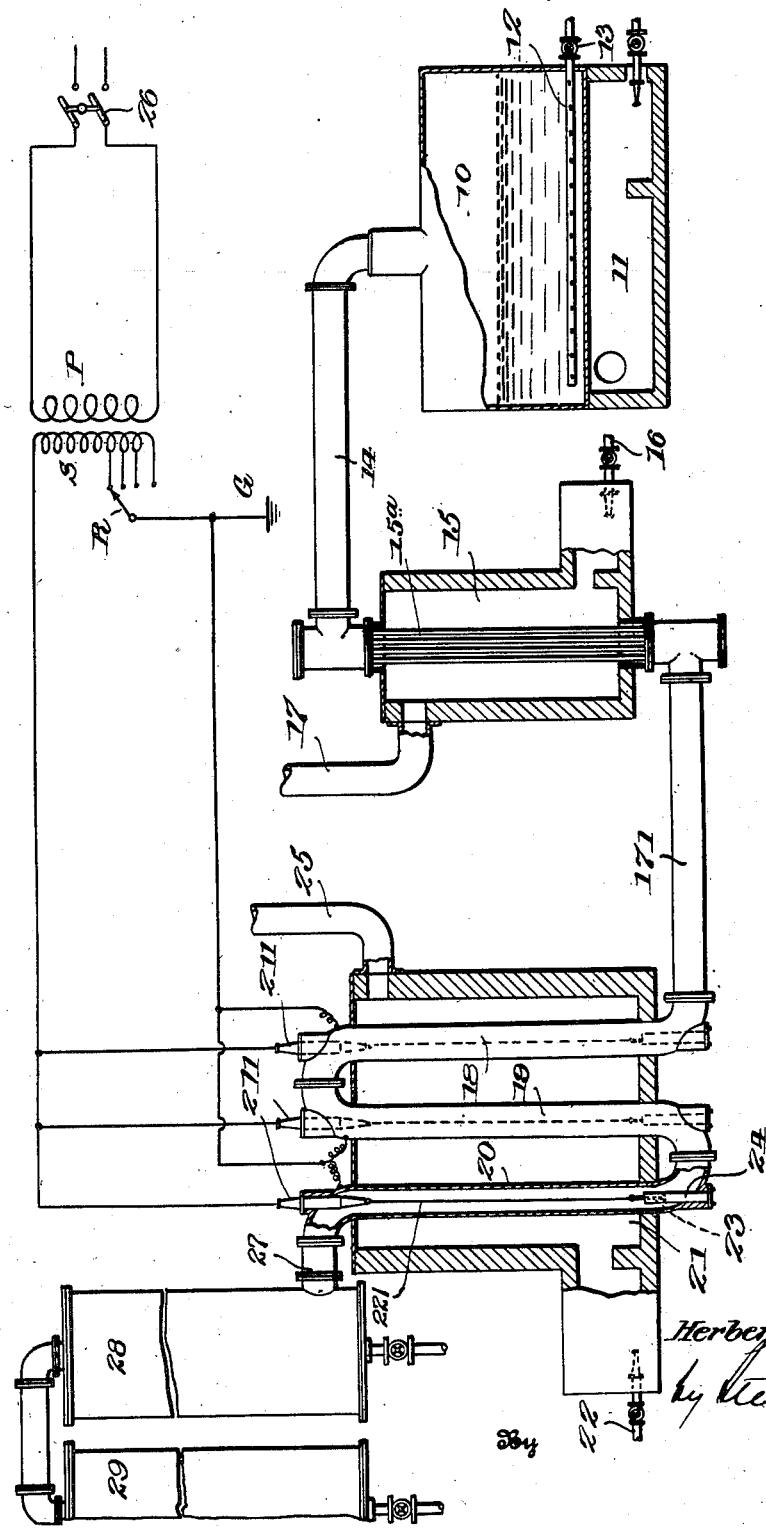

Patented Oct. 21, 1930

1,779,402

UNITED STATES PATENT OFFICE

HERBERT R. ROWLAND, OF EAST ORANGE, NEW JERSEY, ASSIGNOR TO C & C DEVELOPING COMPANY, OF KANSAS CITY, MISSOURI, A CORPORATION OF ARIZONA

ART OF MANUFACTURING USEFUL PRODUCTS FROM HYDROCARBONS

Application filed November 21, 1923. Serial No. 676,080.

This invention relates to improvements in art of manufacturing useful products from hydrocarbons; and it relates more particularly to the conversion of mineral oils of relatively high specific gravity (low Baumé) and high boiling point into oils of lower specific gravity and boiling point by the action of heat and an electrical discharge of suitable character.

It has been proposed heretofore to treat mixtures of mineral oil vapors and a hydrogen-containing gas in heated condition with a high-tension electric discharge of the so-called silent or corona type. It has been generally believed that, in order to successfully achieve splitting or cleavage of the heavy hydrocarbon molecules and combination of hydrogen or light hydrocarbons with the resultant split molecules to the necessary extent, it is essential to employ a high tension discharge that is oscillatory in character and of high frequency. It has been supposed that the effect of the high frequency was to produce a molecular vibration of such character as to result, as it were, in a shattering effect upon the molecules, causing a splitting or breaking up thereof; and that without the use of a high frequency discharge it was not possible to effect the desired conversion. It has also been proposed to treat hydrocarbon vapors with a pulsating unidirectional discharge, the sudden surges or pulsations of the discharge being relied upon to produce the splitting or breaking down of the heavy hydrocarbon molecules and production of lighter products. This type of method last referred to requires no further consideration here since the present invention, in its most desirable embodiments, is not concerned with processes employing a unidirectional discharge but involves the employment of an alternating current discharge, differing widely, however, from the processes heretofore known in which latter the use of high-frequency was an essential characteristic. In certain of its phases, however, the present invention does not depend for novelty upon the specific character of the high-tension discharge employed, so long as such discharge exercises a converting action on the vapors subjected thereto.

In the conversion of heavy hydrocarbons into lighter by the employment of high-tension high-frequency oscillating electrical discharges, certain serious difficulties are encountered that are inherent in such methods. In the first place the apparatus installation required for operation of a plant under this system is elaborate and complicated in design and very expensive to construct and install. Another and even more serious drawback is that under the most favorable conditions the current efficiency of such a system is invariably extremely low, resulting in highly uneconomical operation. More important still, it is found that in a system of this kind the operation is not steady or uniform, but often varies rather widely at different periods during a run for reasons that are not altogether apparent but which are evidently due to conditions that for all practical purposes are uncontrollable. That is to say, an excellent degree of conversion may be obtained at one stage during a run, while at a slightly later stage the conversion drops to a very low figure, the performance thus being often erratic and undependable. This is probably due, at least in part, to the practical impossibility of maintaining the applied voltage even approximately constant, and this results in nonuniformity in the character of the silent or corona discharge. These are among the more important considerations that tend to militate against establishing high-frequency methods on a sound commercial basis.

It is a principal object of the present invention to avoid the difficulties heretofore encountered as above outlined, and to provide an electrical method for conversion of relatively heavy mineral oils and the like into lighter products, in which the operating procedure and apparatus employed are substantially simplified and rendered more easily controlled and dependable, especially as regards amount and quality of output; not to mention the fact that installation and operating costs are greatly reduced.

Another object of the invention is to control the heating of the vapors subjected to the electrical discharge, whatever may be its character, in such manner as to render the electrical discharge treatment still more uniform and dependable, and also to favor minimum formation of unsaturated compounds of undesirable character that would tend to lower the quality of the conversion products obtained.

With the foregoing objects in view, as well as others that will become apparent as the description proceeds, the invention consists in the process and apparatus which will be hereinafter described in connection with advantageous specific illustrative embodiments thereof and will then be more particularly pointed out in the claims.

The applicant has found that, contrary to the belief heretofore prevailing in this art, conversion of mineral oils into lighter products by treatment of the same in vapor form with a high-tension electrical discharge can be effected satisfactorily by the use of low-frequency alternating current; and that not only is satisfactory conversion obtained, but certain further very great practical advantages are thereby realized especially in the way of materially simplifying this general method and the apparatus necessary to effect the operation, and of attaining much better electrical efficiency. The terms "high-frequency" and "low-frequency" are of course relative terms, but they have attained fairly definite significance in the electrical art. Employed in its broadest sense in connection with the present invention, the term "low-frequency" is to be understood as excluding frequencies greater than audio-frequencies, that is, greater than 10,000 cycles per second as an extreme upper limit, and as signifying more usually frequencies not exceeding 500 to 1000 cycles per second. However, in its more specific aspects, the invention is concerned especially with the employment of so-called commercial frequencies, which in present American practice are usually 25 to 60 cycles, and which for the purposes of a convenient definition may be said to comprise frequencies within a range of from 25 to 150 cycles. It is this more specific aspect of the invention, that is, the employment of commercial frequencies as herein defined, that characterizes the invention in the best practical embodiment thereof at present known to this applicant; and although it is to be understood that the scope of the invention is not restricted to employment of the commercial frequencies aforesaid, such frequencies are especially advantageous for the purposes of the invention and are generally to be recommended.

One of the greatest advantages accruing from the employment of low frequencies, especially commercial frequencies as defined above, is the ease with which the process can be controlled and made to yield a product that is uniform and dependable both as regards quantity and quality. A system employing low frequency in accordance with the process of the invention, can be maintained in operation for relatively long periods of time while holding substantially constant the relatively high voltage necessary for production of the desired electrical discharge to which the hydrocarbons to be converted are subjected. This is in contrast to the aforesaid high-frequency methods wherein the applied voltage, always more or less indeterminate, necessarily fluctuates between relatively wide limits due to the inherent characteristics of the circuits used in producing the discharge.

Another important feature of the invention consists in the method of bringing the hydrocarbon vapor mixture to be treated up to the proper converting or cracking temperatures, and maintaining it at such temperatures during treatment by the high-tension discharge. In the best embodiment of the present process, therefore, the hydrocarbon vapor mixture to be subjected to the electrical discharge is in effect superheated before being subjected to the discharge. This is most desirably accomplished by special heating means of such character that the vapors can be brought to a temperature substantially above that at which they were evolved, and most desirably to a temperature approximating the desired treating temperature, under conditions minimizing local overheating. It is found that by proceeding in this way not only is the temperature control simplified and the electrical treatment rendered more satisfactory and efficient, but furthermore the character of the lower boiling products obtained after completion of the electrical treatment is favorably influenced especially in keeping down the content of undesirable unsaturates that are otherwise likely to be formed in some cases to an undesirable extent.

The term cracking as herein employed is to be understood in a broad sense as signifying generally a conversion, transformation or decomposition by which relatively heavy hydrocarbon molecules are so altered as to produce products of lower molecular weight. The term cracking as herein used is not to be understood in the narrower sense in which it is often used to designate specifically a drastic breaking down action that is accompanied by copious production of free carbon and fixed gases. As will fully hereinafter appear, the process of the present invention, when properly carried out, involves the production of little or no fixed carbon or coke, and a minimum production of fixed gases.

With the foregoing general considerations in mind, the principles of the invention will now be further explained in connection with a specific concrete example of one practical way in which the novel process can be carried out in a typical system of apparatus that has been found suitable and that is also novel. It is to be understood, however, that the practice of the process is not confined to the use of the particular type of apparatus here illustrated by way of example, although this novel apparatus is deemed at present most desirable to employ. Said apparatus is illustrated more or less diagrammatically in the accompanying drawing which represents a typical installation in side elevation, parts being shown broken away and in section.

Referring to the drawing, the relatively heavy mineral oil which is employed as starting material, and which may be a crude kerosene distillate in a typical instance, is distilled in a still 10 of ordinary type, heated by a suitable furnace 11. In the best embodiment of the invention, the vapors of the heavy oil are not treated alone by the electrical discharge, but are treated in mixture with a hydrogen-containing gas, which may be introduced and mixed therewith in any appropriate manner. The employment of a suitable hydrogen-containing gas is of great importance because of its protective action in preventing or minimizing separation of free carbon and formation of coky deposits in the converting zone to be hereinafter described; and accordingly the employment of such a gas in mixture with the kerosene or other heavy hydrocarbon vapors is to be strongly recommended. In the present instance, such a gas is introduced below the level of the liquid oil in still 10 by forcing the same through perforated supply pipe 12, provided with controlling valve 13 whereby the proportion of such gas in the mixture to be treated can be accurately regulated and adjusted as may be necessary. In practice it is desirable to introduce a considerable excess of such hydrogen-containing gas. Natural gas, which is high in methane, is typical of a hydrogen-containing gas that can be used to advantage in practice; and in this connection it is to be noted that the available hydrogen of the hydrogen-containing gas may be in either free or combined condition. Other gases or vapors rich in hydrogen or light hydrocarbons, or both, are suitable. In some cases it is desirable to preheat the hydrogen-containing gas before introducing it into the mineral oil or the vapors thereof.

The mixture of oil vapors and added hydrogen-containing gas passes from the vapor space of still 10 through vapor line 14 to a preheater or superheater chamber 15 which may be fired by oil burner 16 or other suitable means, waste gases leaving the chamber through stack 17. In order to effect efficient preheating or superheating of the vapor mixture, while at the same time avoiding local overheating, the vapor line 14, as it enters the superheating chamber, is subdivided into a plurality of relatively small pipes or tubes 15$^a$ around which the hot gases from the firing means 16 pass. These tubes 15$^a$ being of relatively small diameter, the gases passing through them can be heated to the desired temperature by a moderate firing of the preheating chamber; whereas, if the single relatively large diameter vapor line 14 were continued through the superheater, very much higher temperature would be required in the superheater to raise the vapor mixture as a whole to the desired temperature preparatory to the subsequent electrical treatment. This is because the relatively poor heat conductivity of the vapors and gases would necessitate a much higher temperature in the superheating chamber in order to carry the necessary heat units to the vapors traveling near the axis of the large diameter vapor line. Thus the vapors next to the wall of the vapor line would become considerably overheated, and this overheating favors formation of a relatively high proportion of unsaturates in the final product of the process. But where tubes 15$^a$ of small diameter are used, the heat has to be transmitted a much shorter distance to the center of each tube, and accordingly the temperature gradient may be very much less and the danger of overheating is practically eliminated. In a typical instance, the vapors in passing through the superheater 15 may attain a temperature of around 850 to 900° F.; and in order to preheat the vapors to such temperatures, the temperature in the preheater outside of the tubes 15$^a$ may be around 1050° to 1150° F. The temperature in the superheater would have to be several hundred degrees higher if the vapor line 14 were continued through the superheater without being split up into smaller diameter tubes.

The superheated mixture of oil vapor and added hydrogen-containing gas is conducted from the superheater through vapor line 171 to the electrical treater which is here shown as a sinuous metallic conduit providing three vertical treating tubes or chambers 18, 19 and 20 through which the vapors pass serially, said treating tubes being housed within a heating furnace 21 fired by suitable burner means 22. Within each of the treating tubes 18, 19 and 20 is axially suspended from an upper insulator 211 a fine wire electrode 221, said fine wire electrodes all being connected as shown to one side of the secondary S of a step-up transformer whose primary is indicated at P. The metal wall of each treating chamber constitutes an electrode cooperating with the fine wire electrode, the tube walls being connected as shown to the other side of the transformer secondary S, and also being grounded at G as a precautionary measure. Attached to the lower end of each fine wire electrode 221 is a tensioning and guiding plummet 23 of insulating material, said plummet being slidable within a stationary tube 24, also of insulating material, supported axially on the base of the treating chamber. Current is supplied to the primary of the transformer from any suitable low-frequency alternating current source. For instance, current may be taken from commercial power or lighting mains at 60 cycles and 220 volts. In the secondary this is stepped up to the voltage necessary to give the desired type of high tension discharge in each treating tube between the central fine wire electrode and the tube wall. Assuming the use of treating tubes of 12 inches internal diameter and nichrome wire discharge electrodes of 30 B. & S. gage, an indicated voltage of between 26,000 and 28,000 volts, about 27,000 volts in a typical instance, is found to give a high-tension non-arcing discharge of the silent or corona type especially desirable for treatment of the vapor and gas mixture passing through the series of treating tubes. The voltage can be adjusted as may be necessary by means of a suitable voltage regulator indicated generally at R. While the voltage necessary to produce the desired type of discharge necessarily depends upon the dimensions of the particular apparatus employed and upon other factors of operation, the best voltage to employ for any given treating apparatus is well defined and lies within a rather narrow range whose practical upper and lower limits are readily ascertainable by observation of the discharge within the treating tubes.

The mixture of oil vapors and gas passing through the series of treating tubes and being subjected to the high-tension electrical discharge therein, should be maintained within a range of temperatures best suited to obtain most satisfactory conversion into lower boiling products according to the type of relatively heavy oil being treated. Where the oil to be converted is a crude kerosene distillate, as assumed in this typical instance, a temperature of between 800° and 900° F., and averaging about 850° F., is found to give satisfactory results, although somewhat higher temperatures, say around 950° to 1000° F. may in some cases be employed to advantage. In general, the temperature should ordinarily be above 700° F. Since the gas and vapor mixture supplied to the treating tube system through vapor line 17 is preheated to a temperature approaching, and in this instance approximately equaling, that at which the vapors are electrically treated, only moderate firing of the furnace chamber 21 surrounding the treating tubes is required to maintain the treating temperature within the predetermined range. Hence close regulation and control of the treating temperature is feasible, and danger of local overheating is minimized. Waste gases from this heating furnace make their exit through stack 25.

It is to be understood that all parts of the apparatus having surfaces exposed to atmosphere may be lagged with heat insulating material.

In the treating tube system, the mixture of vapor and gases undergoes conversion with formation of lower boiling products. That splitting up or cleavage of heavy molecules into a large number of smaller molecules goes on is evidenced by the fact that, when the temperature is held constant at the desired operating point, closing the switch 26 and subjecting the gases in the treating tube system to the alternating low frequency silent discharge promptly causes an increase in pressure within the tubes which is readily observable with a manometer.

The treated mixture of oil vapors and gas leaves the treating tube system through vapor line 27 and is then treated according to known methods to separate therefrom the lower boiling product or products resulting from the described treatment. For instance, the treated vapors may be conducted by vapor line 27 to dephlegmating and condensing means of usual types, indicated conventionally at 28 and 29 respectively, and a liquid conversion product of the motor fuel type recovered. For example, starting with a crude kerosene distillate of 41° Baumé gravity and using natural gas as the hydrogen-containing gas mixed with the kerosene vapors, a yield of about 65 per cent or more of a crude motor fuel of about 50.3° Baumé gravity is readily obtainable. The boiling range of the crude kerosene distillate in a typical instance is 381° to 597° F., and the boiling range of the crude motor fuel obtained is about 122° F. to 420° F. The crude motor fuel can be refined by usual methods of re-distillation, filtration, etc. In carrying out the process as described, there is practically no separation of free carbon either in the superheater 15—16 or the electrical treating tubes even after long continued operation, and the formation of so-called fixed gases is also relatively low. The operation of the system as a whole is smooth and easily controlled, the applied voltage over the treating electrodes remaining constant for hours at a time. The process is therefore relatively easy to conduct and to control in such manner that the quality and quantity of the final product obtained are uniform and dependable. As before stated, this is attributable primarily to the use of low-frequency alternating current, particularly commercial low frequencies. Apart from this, however, it is also due in substantial degree to the step of superheating the vapor and gas mixture before it enters the electrical treating system, thus rendering the control of the temperature in the electrical treating stage much simpler and more accurate than would otherwise be the case.

The proportion of hydrogen-carrying gas that should be mixed with the oil vapors may vary considerably in practice, but in general it is advisable to use a substantial excess of such gas, which may of course be returned and passed through the process again cyclically, together with any so-called fixed gases incidentally produced in the converting or cracking treatment, these latter being also suitable hydrogen-carrying gases for the purposes of this invention. In a typical instance, using crude kerosene distillate as the starting material, it has been found satisfactory to use from 3 to 4.5 cubic feet of natural gas to each gallon of the kerosene distillate vaporized.

Crude kerosene distillate has been referred to as a typical relatively heavy oil that may be converted into lower boiling products, such as gasoline and other types of motor fuel, by the present process. Gas oil or other heavy oils may of course be treated in a similar manner for the production of lower boiling products.

The pressure prevailing in the system may be, and commonly is, substantially atmospheric. The process may be carried out with success at pressures above atmospheric, however; and subatmospheric pressure may also be employed although usually offering no practical advantage.

While, for the sake of an illustrative example, reference has been made in the foregoing description more particularly to the conversion of oils into lighter products, it is to be understood that the principles of the invention are applicable to hydrocarbons generally in gaseous or vapor phase and are modifiable or convertible by a high tension electrical discharge in such manner as to yield useful products.

What is claimed is:

1. The process of treating a mineral oil to produce lower boiling products therefrom which comprises subjecting a mixture of vapors of such mineral oil with a suitable hydrogen-containing gas, at a converting temperature, to the action of a high-tension alternating current electrical discharge of frequency not exceeding 10,000 cycles per second and separating from the resultant vapor mixture a liquid product that is lower boiling than said mineral oil.

2. The process of treating a mineral oil to produce lower boiling products therefrom which comprises subjecting a mixture of vapors of such mineral oil with a suitable hydrogen-containing gas, heated to a converting temperature in excess of 700° F., to the action of a silent discharge produced by high-tension alternating current of frequency not exceeding 10,000 cycles per second, and separating from the resultant vapor mixture a liquid product that is lower boiling than said mineral oil.

3. The process of converting mineral oils into lower-boiling products which comprises vaporizing a mineral oil and mixing with the oil vapors a suitable hydrogen-containing gas, heating the mixture to a temperature substantially higher than that at which said oil vapors were evolved, then subjecting the heated mixture to the action of a high tension electrical discharge of frequency not exceeding 10,000 cycles per second and separating a desired lower-boiling liquid product from the mixture so treated.

4. The process of converting mineral oil into lower boiling products which comprises subjecting mineral oil vapors to the action of a high-tension alternating current discharge of frequency not exceeding 10,000 cycles per second at a temperature favorable to conversion of said mineral oil vapors into lower-boiling products, and separating from the treated vapors such a lower-boiling product.

5. The process of oil conversion which comprises vaporizing a mineral oil, heating the vapors substantially above the temperature at which they were evolved, under conditions minimizing separation of free carbon, subjecting said vapors to the action of an alternating current silent discharge of frequency not exceeding 10,000 cycles per second and separating a liquid conversion product of the motor fuel type from the treated vapors.

6. The process of oil conversion which comprises providing a mixture of mineral oil vapors and a suitable hydrogen-containing gas at above 700° F., then subjecting said mixture to the action of a high-tension electrical discharge of frequency not exceeding 10,000 cycles per second while further heating said mixture to maintain it at a converting temperature above 700° F., and condensing a desired conversion product from the treated mixture.

7. The process of manufacturing useful products from hydrocarbons which comprises subjecting a hydrocarbon material in the form of gas or vapor to the action of a high-tension alternating electrical discharge of frequency not exceeding 10,000 cycles per second at a temperature favorable to conversion into the desired product, and separating such desired product.

8. The process of manufacturing useful products from hydrocarbons which comprises subjecting a relatively heavy hydrocarbon material in vapor form in admixture with a suitable hydrogen-containing gas to the action of a high-tension alternating electrical discharge of frequency not exceeding 10,000 cycles per second at a temperature favorable to conversion of such heavy hydrocarbon material into a lighter product, and separating such lighter product from the treated mixture.

9. The process of treating a mineral oil to produce lower boiling products therefrom, which comprises subjecting a mixture of vapors of such mineral oil with a suitable hydrogen-containing gas, at a converting temperature, to the action of a high tension alternating current electrical discharge of a frequency of from 25 to 150 cycles per second, and separating from the resultant vapor mixture a liquid product that is lower boiling than said mineral oil.

10. The process of treating a mineral oil to produce lower boiling products therefrom, which comprises subjecting a mixture of vapors of such mineral oil with a suitable hydrogen-containing gas, at a converting temperature, to the action of a high tension alternating current electrical discharge of a frequency of from 25 to 60 cycles per second, and separating from the resultant vapor mixture a liquid product that is lower boiling than said mineral oil.

11. The process of converting mineral oil into lower boiling products which comprises subjecting mineral oil vapors to the action of a high tension alternating current discharge of a frequency of from 25 to 150 cycles per second at a temperature favorable to conversion of said mineral oil vapors into lower boiling products, and separating from the treated vapors such a lower boiling product.

12. The process of converting mineral oil into lower boiling products which comprises subjecting mineral oil vapors to the action of a high tension alternating current discharge of a frequency of from 25 to 60 cycles per second at a temperature favorable to conversion of said mineral oil vapors into lower boiling products, and separating from the treated vapors such a lower boiling product.

13. The process of manufacturing useful conversion products from liquid hydrocarbons which comprises heating liquid hydrocarbon material to obtain vapors therefrom, heating said vapors to a temperature substantially above the temperature at which they were evolved, subjecting the thus heated vapors to the action of a high-tension alternating currnt discharge of frequency not exceeding 10,000 cycles per second while supplying such further heat as may be required to maintain said vapors at the desired conversion temperature, and separating a desired conversion product from the resultant treated vapors.

14. Apparatus for treating oil comprising the combination, with an oil vaporizer, of a superheater connected to said vaporizer and arranged to receive vapors therefrom, and a high tension electrical treater connected to said superheater and adapted to receive vapors from said superheater.

15. Apparatus for treating oil comprising the combination, with an oil vaporizer, of a superheater connected to said vaporizer and arranged to receive vapors therefrom, a high tension electrical treater connected to said superheater and adapted to receive vapors from said superheater, and means for heating said electrical treater.

16. Apparatus for treating oil comprising the combination, with an oil vaporizer having a vapor offtake, of a superheater having a plurality of small-diameter heating tubes, a vapor line connecting said offtake with said heating tubes, a high tension electrical treater connected to and adapted to receive superheated vapors from said heating tubes, and means for heating said electrical treater.

In testimony whereof I hereunto affix my signature.

HERBERT R. ROWLAND.